United States Patent [19]

Skopp

[11] 4,299,203
[45] Nov. 10, 1981

[54] TUBULAR SOLAR COLLECTOR SYSTEM

[75] Inventor: Alvin Skopp, Clark, N.J.

[73] Assignee: Exxon Research & Engineering Co., Florham Park, N.J.

[21] Appl. No.: 93,753

[22] Filed: Nov. 13, 1979

[51] Int. Cl.³ .............................................. F24J 3/02
[52] U.S. Cl. .................................. 126/443; 126/434; 126/442; 126/417; 165/76; 165/48 S
[58] Field of Search .............. 126/443, 434, 433, 432, 126/417, 446, 442; 165/76, 105, 106, 48 S

[56] References Cited

U.S. PATENT DOCUMENTS

| | | | |
|---|---|---|---|
| 308,197 | 11/1884 | Rober | 165/106 X |
| 980,505 | 1/1911 | Emmet | |
| 2,247,830 | 7/1941 | Abbot | 126/434 |
| 2,893,706 | 7/1959 | Smith | 165/106 |
| 3,952,724 | 4/1976 | Pei | 126/443 |
| 4,018,215 | 4/1977 | Pei | 126/443 |
| 4,067,315 | 1/1978 | Fehlner et al. | 126/443 X |
| 4,127,105 | 11/1978 | Watt | 165/105 X |

FOREIGN PATENT DOCUMENTS 52-131669  5/1977  Japan .................................. 126/433

OTHER PUBLICATIONS

Mahdjuri, "Evacuated Heat Pipe Solar Collector", Solar Energy and Conservation Symposium-Workshop, Dec. 1978, Miami Beach, Florida.

Primary Examiner—Larry Jones
Attorney, Agent, or Firm—Joseph J. Dvorak

[57] ABSTRACT

A tubular solar collector system is provided in which a heat absorbing fluid is contained within tubular solar collectors completely separate and independent from a fluid circulated through the manifold to which the tubular collectors are operably attached. The collectors extend downwardly from the generally horizontal manifold so that when the fluid within the tubular collector is heated by incident solar radiation it is circulated to a heat exchanger in the manifold by thermosyphoning action.

6 Claims, 4 Drawing Figures

4,299,203

TUBULAR SOLAR COLLECTOR SYSTEM

FIELD OF THE INVENTION

The present invention relates to solar collectors. More particularly, the present invention relates to solar collectors of the type employing a plurality of vacuum jacketed glass tubular collector members.

BACKGROUND OF THE INVENTION

In tubular types of solar energy collector systems, a plurality of vacuum jacketed glass tubular collector elements are operably connected into a manifold which serves to distribute and collect working fluid circulated, for example, by means of a pump through the tubular solar collector members for heating therein. Such systems are exemplified by the following U.S. Pat. Nos. 980,505; 3,952,724; 4,018,215. Among the disadvantages of the foregoing types of systems is the fact that a break in any one of the tubular solar collectors will result in a loss of fluid from the system, thereby making the entire system inoperable. Additionally, if vacuum is lost in one or more of the vacuum jackets of the tubular collector, the entire system may have to be shut down in order to repair or replace such tubular member.

SUMMARY OF THE INVENTION

The present invention provides a tubular type solar energy collector system which is designed so that a break in any one of the tubular collector members does not render the system inoperable and indeed permits a simple and rapid replacement of damaged tube or tubes without shutting down the entire system.

Broadly stated, the tubular solar collector system of the present invention includes a manifold having a plurality of generally downwardly extending vacuum jacketed tubular solar collector members operably and detachably connected to the manifold via heat exchange members within the manifold. Each tubular solar collector member is sealed or closed at its ends and contains a first fluid therein which during operation is circulated by thermosyphoning flow in heat exchange relationship with a heat exchange member of the manifold for heating a second separate fluid circulated through the manifold. Since the fluid circulated through the manifold (and ultimately transferred to a point of use) is separate from the fluid circulating in the tubular solar collector, any break in a collector tube merely renders that one tube ineffective but permits the system to continue to operate. Additionally, the damaged tube can be readily replaced without shutting down the entire system.

These and other embodiments of the present invention will be appreciated upon a reading of the specification in conjunction with the accompanying drawings.

DETAILED DESCRIPTION OF THE INVENTION

Figure 1:
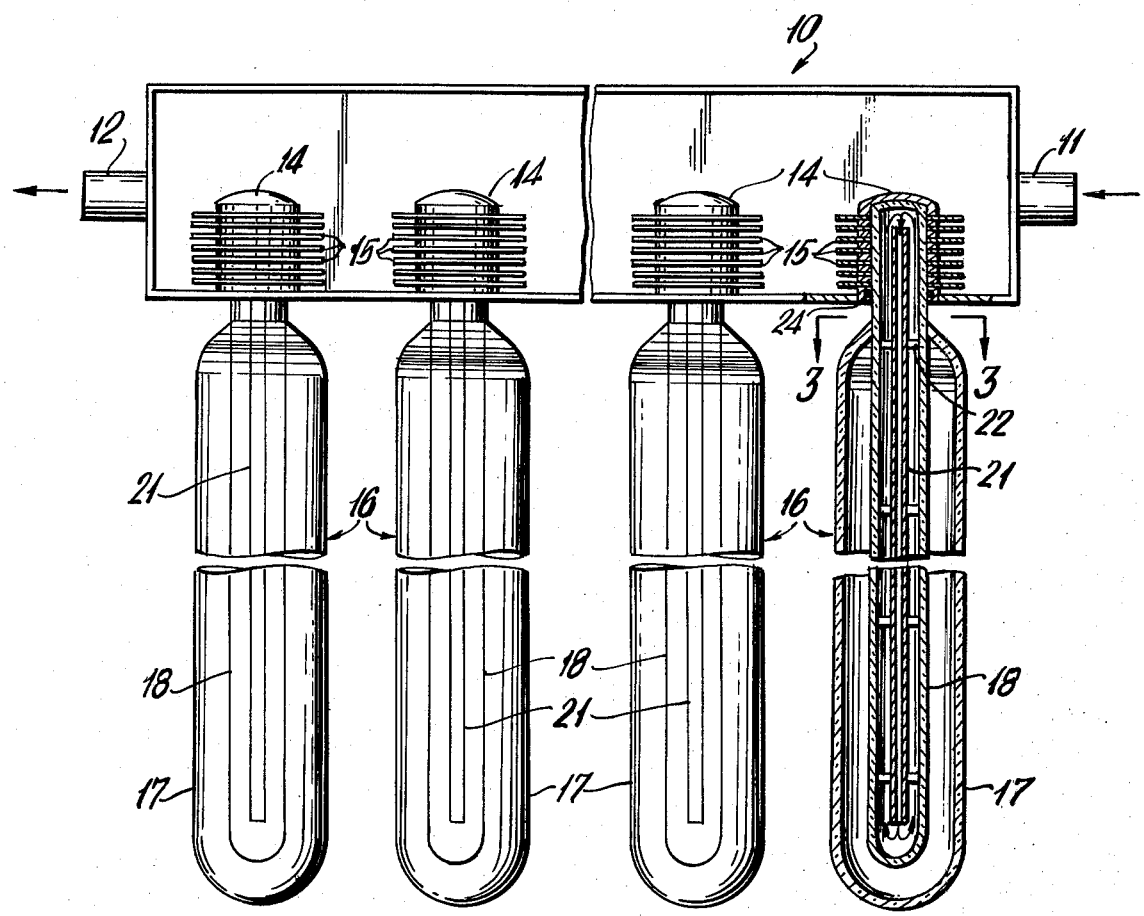
FIG. 1 is a front elevation, partly in section, showing a plurality of collectors mounted on a manifold having a heat exchanger means located within the manifold.

Referring now to the Drawings, it should be noted that like reference characters designate corresponding parts throughout the several drawings and views.

FIG. 1 shows an embodiment of the invention and the operation of a solar collector system in accordance therewith. Specifically, the solar collector is composed of a manifold 10 having a fluid inlet port 11 and a fluid outlet port 12. Located within the manifold are a plurality of heat exchanger means 14. As can be seen, the heat exchanger means 14 are provided with expanded heat exchange surfaces or fins 15.

Figure 2:
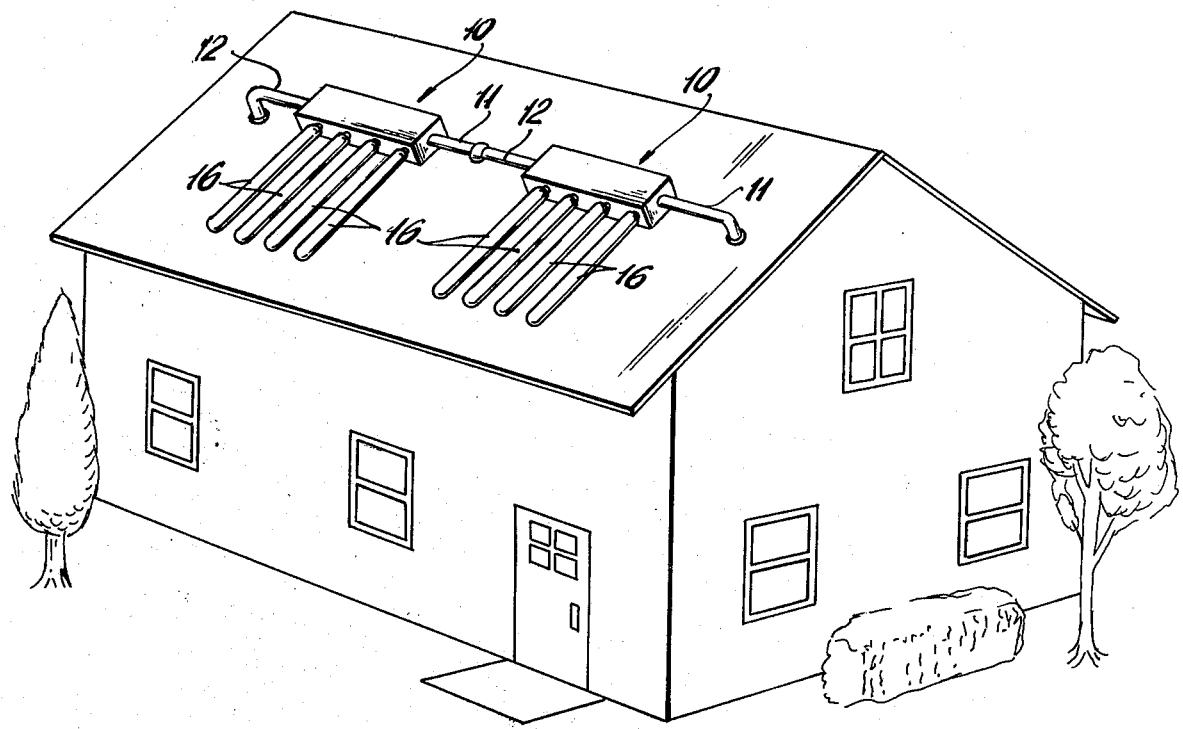
FIG. 2 is a perspective view of the tubular solar collector system of the present invention mounted on the roof of a house.
Figure 3:
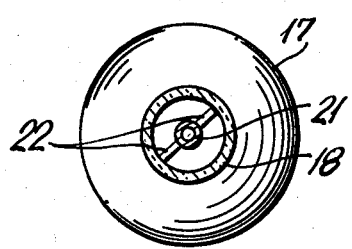
FIG. 3 is a cross-sectional view of the solar collector tube taken along lines 3—3 in FIG. 1.

Attached to the manifold 10 are a plurality of vacuum jacketed tubular solar collectors 16. As is shown in FIGS. 1 and 2, the vacuum jacketed tubular solar collectors 16 are positioned such that in use they extend downwardly from manifold 10 and they are, of course, in operable communication with heat exchanger means 14. The tubular collectors 16 have been shown partially broken away and in cross-section in order to more clearly illustrate the structure of the tubular collectors 16 and their connection to the manifold 10.

As can be seen throughout the several drawings and views, the vacuum jacketed tubular collectors 16 have an outer light transparent tube 17 of a convenient length, say from 4 to 7 feet, and preferably of standard diameter similar to fluorescent light tube, for example 2" O.D. Within the exterior tube 17 and extending at a first end therebeyond is an inner tube 18 obviously of lesser diameter than the outer tube 17. The inner tube 18 is secured within the outer tube 17 such that the space therebetween can be and is evacuated. Thus, outer tube 17 provides a vacuum jacket for inner tube 18.

In the embodiments shown in FIGS. 1, 3, 4 and 5, a fluid distribution tube 21 is located centrally within the inner tube 18 by means of spacers 22.

The tubes 17 must be light transparent, and, consequently, for all practical purposes will be made from glass. The tubes 18 and 21 and spacers 22 may be made of glass or any other material that will withstand operating temperatures generally in the range of about 50° C. to about 200° C. Preferably, tubes 17, 18 and 21 and spacers 22 are fabricated from known or standard glass materials, such as lime glass compositions or borosilicate compositions. Both of these glasses are eminently suitable since they are relatively inexpensive.

In the present invention, the inner tube 18 is coated on either its outer or inner wall, and preferably on its outer wall, with an energy absorbing coating having a very high absorptivity and low emissivity such as black chrome, nickel, lead, black carbon and certain copper oxides. The coating, of course, can be applied by painting the exterior surface thereof or by other well known techniques.

Figure 4:
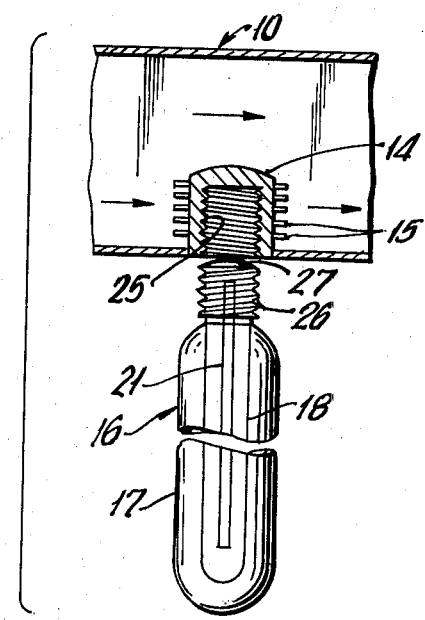
FIG. 4 is a sectional view showing an alternate structure for the assembly of the solar collector tube and manifold heat exchanger of the present invention.

As can be seen, particularly with reference to FIG. 1, the manifold receptacle for the solar collector tubes 16 is comprised of a substantially cylindrical (in cross-section) heat exchange member 14 which extends into the interior of manifold 10. As noted hereinabove, the heat exchange members 14 are provided with a plurality of heat exchange surfaces or fins 15. The first end of the inner tube 18 of the tubular collector 16 is designed to fit in close contact with the heat exchanger 14. As is shown in FIG. 1, the tubular collector 16 is held fast in the manifold by means of a gasket or O-ring 24. The gasket or O-ring may be made of rubber or suitable plastic material. Optionally, as is shown in FIG. 4, the heat exchange member 14 may have an internal thread 25 and the tubular collector 16 may also be provided at one end with a mating thread portion 26. This threaded portion 26 is a metal threaded portion that is joined to the glass by suitable glass to metal seal. Other suitable techniques may be employed for holding the tubular collector 16 in contact, at its first end, with the heat exchanger 14.

It should be noted that the inner tube 18 of tubular collector 16 is closed at bottom end of tube 18. Also, inner tube 18 contains a charge of a heat absorbing working fluid, such as water, a silicone or a heat transfer oil. Depending upon the vapor pressure of the working fluid, it may be necessary to make some accommodation for the pressure increase that may result from heating the working fluid during use of the collector. Thus, the working fluid may be sealed within inner tube 18 under reduced pressure as a simple and effective technique for adjusting for potential increased pressure within the tube. Other techniques also may be employed. For example, top 27 of threaded portion 26 may be designed as a flexible diaphragm.

As will be readily appreciated, the collector system is installed preferably in an oblique position and always with the manifold in a generally horizontal position with respect to the ground and with the manifold being above the tubular collectors 16.

In operation, as solar radiation impinges on the tubular solar collector, the solar energy, primarily in the form of light, is absorbed by the absorbing surface and the heat generated is transferred to the working fluid within the tubular collector. The heated fluid then expands, becomes less dense, and begins to rise. As a consequence, the heated fluid begins to flow toward the heat exchanger member 14 where it transfers its heat to the heat exchanger member. As the liquid cools by such heat transfer, it becomes more dense and begins to flow downward. Thus, the fluid is circulated by thermosyphoning action and flows, as is shown by the arrows in FIG. 1. A second fluid is separately circulated, for example by means of a pump (not shown), through the inlet port 11 of manifold 10 in heat exchange relationship with the heat exchange members 14. Thus, the heat of the first fluid is exchanged or given up to the second fluid via the heat exchanger members and the first fluid is returned back downwardly toward the distal end of the solar collector where it is again heated. The second fluid in the manifold is removed via the outlet port 12 to a point of use.

One of the significant advantages of the tubular solar collector system of this invention is that should any one of the tubular collectors be damaged or malfunction, the entire system need not be shut down. Indeed, the entire system can operate with one or two defective tubes. Additionally, the defective unit may be removed and a replacement unit inserted also without shutting down the entire system.

As will be appreciated, the tubular collector system of this invention may be fabricated in modular sections and subsequently a plurality of modules may be interconnected in series as is shown in FIG. 2. Additionally, parabolic and/or focusing reflectors can be placed behind the tubular solar collectors for concentrating solar radiation incident upon the collector. These and other modifications and alternatives may be resorted to without departing from the spirit and scope of the appended claims.

What is claimed is:

1. A solar collector comprising: a manifold having an inlet and an outlet for the introduction of and removal from said manifold of a fluid, said manifold having a plurality of heat exchange members therein adapted to be in heat exchange relationship with a fluid introduced into said manifold; a plurality of tubular solar collector members extending downwardly from and operably and detachably connected to said manifold heat exchange members such that a first fluid contained within said tubular solar collector member is circulated by thermosyphoning action in heat exchange relationship with said heat exchange member of the manifold to which said tubular member is connected when said tubular collector members are exposed to incident solar radiation whereby heat is transferred from said first fluid to said heat exchange members and to a second fluid introduced into said manifold and wherein said heat exchange members define a wall portion of said manifold thereby preventing the ingress of ambient atmosphere into said manifold when a tubular collector is detached.

2. The apparatus of claim 1 wherein each of said tubular solar collectors comprise a double walled glass collector tube having a first end and a second end, said first end being sealingly mounted and detachably connected to said heat exchange member, and wherein said tubular collector contains means for circulating said first fluid within said tubular collector by thermosyphoning flow to said heat exchange member in said manifold.

3. The apparatus of claim 2 wherein said heat exchange members contain a plurality of fins.

4. A solar energy collector apparatus comprising: a manifold having an inlet and outlet for the introduction of and removal from said manifold of a fluid; a plurality of elongated, light-transparent, cylindrical first detachable tubes extending downwardly from said manifold, said tubes having a first end and a second end, and each of said cylindrical tubes being jacketed by a light transparent cylindrical second tube defining a space therebetween and having the pressure in said space at a reduced pressure, the first end of said first tube extending for a length greater than said jacket; a third tube for fluid circulation located centrally within said first tube and spaced therefrom, said third tube being open at both ends; said manifold having a plurality of heat exchange members adapted to receive said first end of said first tube in operable communication therewith, said heat exchange members adapted to be in heat exchange relationship with a fluid introduced into said manifold and defining a wall thereby preventing ingress of ambient atmosphere into said manifold when a first end of a first tube is detached from said heat exchange member; a first fluid within said first tube whereby said first fluid will circulate through said first tube by thermosyphoning action upon being heated by incident solar radiation and will exchange said heat with said heat exchanger in said manifold whereby a second fluid introduced into said manifold is heated.

5. The apparatus of claim 4 wherein said heat exchange means includes a plurality of fins.

6. The apparatus of claim 5 wherein said first tube at said first end has a male threaded portion and said manifold heat exchange member has a female threaded portion for detachably connecting said first tube to said manifold.

* * * * *